Aug. 24, 1943.                M. R. HUTCHISON, JR                    2,327,797
FOLDING CAMERA
Filed Dec. 6, 1941

MILLER R. HUTCHISON, JR.
INVENTOR
BY
ATTORNEYS

Patented Aug. 24, 1943

2,327,797

UNITED STATES PATENT OFFICE 2,327,797

FOLDING CAMERA

Miller R. Hutchison, Jr., Rochester, N. Y., assignor to Eastman Kodak Company, Rochester, N. Y., a corporation of New Jersey Application December 6, 1941, Serial No. 421,976

8 Claims. (Cl. 95—32)

This invention relates to photography and more particularly to photographic cameras. One object of my invention is to provide a compact camera which may consist of a pair of telescoping parts which may move relative to each other from a closed or folded position and to an open or picture-taking position. Another object of my invention is to provide a camera of the class described in which the parts are relatively simple and can be made inexpensively of sheet material. Another object of my invention is to provide a slidable connection between the two camera parts which will not only produce smooth movement between the camera parts, but will also provide an inexpensive means of obtaining a light-tight connection between the camera parts. Still another object of my invention is to provide a camera in which the front may be automatically projected into a picture-taking position by releasing a latch, and other objects will appear from the following specification, the novel features being particularly pointed out in the claims at the end thereof.

Coming now to the drawing wherein like reference characters denote like parts throughout:

Figure 1:
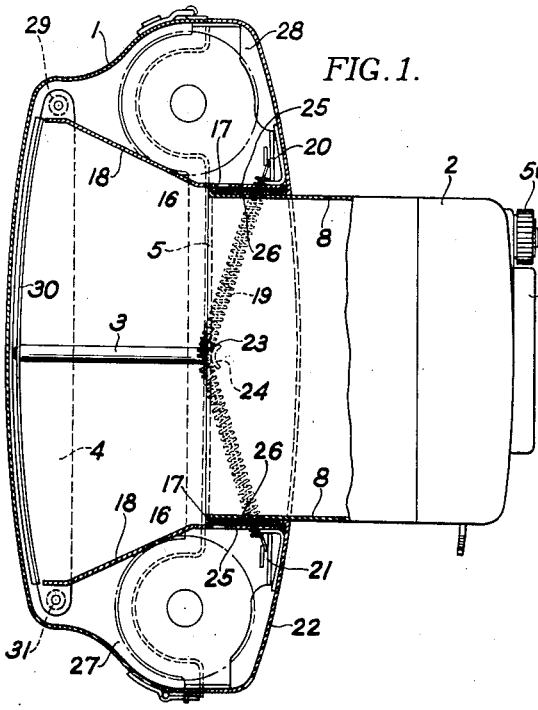
Fig. 1 is a side elevation partially in section of a typical embodiment of my invention, the parts being shown in an open or picture-taking position.
Figure 2:
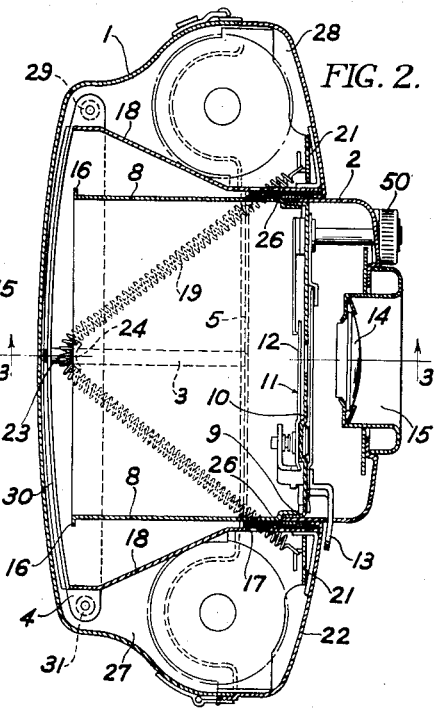
Fig. 2 is a view similar to Fig. 1 with the parts all in section and with the parts in a folded position.
Figure 4:
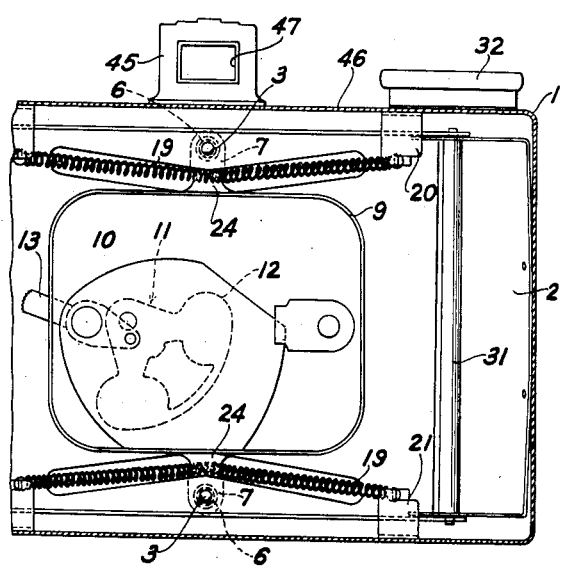
Fig. 4 is a fragmentary sectional view taken on line 4—4 of Fig. 3.

My invention consists broadly in a camera consisting of two parts, a camera body portion 1 and a camera front portion 2, these two parts being movable so that the camera may be opened automatically into the picture-taking position of Fig. 1 or may be folded as indicated in Fig. 2 to make the camera more compact for carrying.

In cameras of this type, particularly where expense is a major item, it has been comparatively difficult to provide two camera parts which would slide with sufficient freedom to permit springs to open the camera which at the same time fit sufficiently tight to hold the slidable section reasonably rigid when in an operating or picture-taking position. My camera has been particularly designed to overcome these defects by providing an accurate slideway between the two camera parts for guiding the parts throughout their complete range of movement and by providing loosely fitting walls with a means for preventing light from leaking between the parts. Thus the parts on which the sliding movement takes place can be readily made accurate and the parts which will serve as a light lock require no special attention in regard to fitting the camera in assembling.

Figure 3:
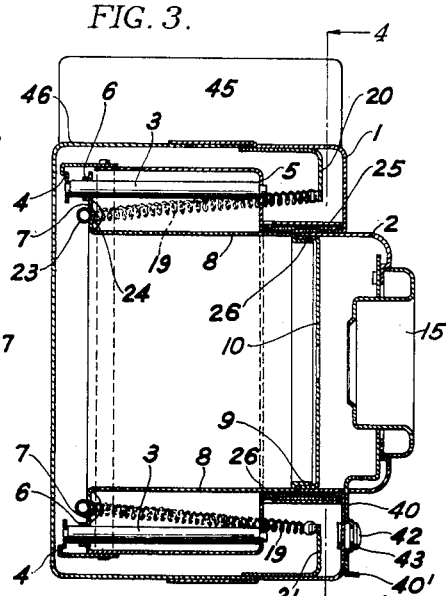
Fig. 3 is a view similar to Fig. 2 but with the section being taken on line 3—3 of Fig. 2, certain parts being omitted for the sake of clearness.

The means for accurately guiding the camera front 2 relative to the camera body 1 in the present instance may consist of a pair of spaced and parallel rods 3 arranged near the top and bottom of the camera body 1, the rear ends of the rods 3 being supported as shown in Fig. 3 by means of brackets 4 and the front ends of the rods being supported in the camera wall 5. Before mounting these rods in place, they are thrust through the formed-up rings 6 carried by the brackets 7 which form a part of the camera front 2, these brackets being either attached to or made integral with the walls 8 which form a rectangular or box-like structure on the front edge 9 of which a mechanism plate 10 for a shutter of any known type may be mounted. This shutter may contain the usual mechanism 11 including a shutter blade 12 which may be operated by a trigger 13, the shutter preferably lying behind the objective 14 carried in the lens cell 15.

The rear edge of the walls 8 are preferably formed with outwardly flaring flanges 16, these flanges being of such a size that they may by engaging the flanges 17 of the camera walls 18 form a stop limiting the outward movement of the camera front section 2 relative to the camera body 1 as will be shown in Fig. 1.

In order to hold the walls 16 and 17 in contact and in order to automatically project the front 2 into a picture-taking position, a pair of springs 19 are employed. These springs are attached by means of lugs 20 and 21 to a front wall 22 of the camera body 1 and have intermediate portions 23 that engage the saddles 24 carried by the camera front 2. Thus, with the camera in a folded position as indicated in Fig. 2, the springs 19 by engaging the saddles 24 always tend to project the camera front from the camera body and into a picture-taking position. The movement of the parts is as above described guided solely by the rails 3 and the rail followers 6 since these parts can be easily fitted to give a smooth and even movement of the camera front 2 relative to the camera body 1.

It is, of course, necessary to provide a light-tight connection between the camera parts 1 and 2. I am able to do this by providing a set of walls 25 on the camera body which are complementary in shape to the camera walls 8 on the camera front 2—that is both of these sets of walls are rectangular in cross-section and they have an extremely loose fit which is not intended to perform the function of guiding the parts since this is taken care of by the rails 3 and the rail followers 6. Between the walls 8 and 25 I provide a soft light-tight gasket 26 which may be formed of a soft plush or other material which will not interfere with the free sliding of the camera front 2 relative to the camera body 3.

The camera body is provided with the usual film spool chambers 27 for the takeup roll and 28 for the supply roll. The film is led from the supply chamber over the usual guide roll 29 across the curved rails 30 and over the guide roller 31 to the take-up film spool chamber. A winding knob 32 on the outside of the camera may engage the take-up film spool in any usual manner.

Figure 5:
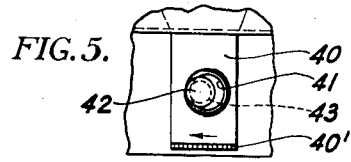
Fig. 5 is a detail elevation of a preferred form of camera latch.

In order to hold the camera parts in the folded position shown in Fig. 2, I provide a latch which consists of an arm 40 extending downwardly through the camera front 2, this arm having an aperture 41 of a diameter larger than that of a stud 42 which, as best shown in Fig. 3, is undercut in such a manner that when the arm 40 engages the stud 42 enclosing the camera it will spring to the left in locking at Fig. 5 after which it will snap into the groove 43 of the stud. Thus, the camera front will be latched in position and it is only necessary to unlatch the camera to move the latch arm 40 in the direction shown by the arrow in Fig. 5 by the handle or serrated portion 40'. The latch arm 40 is mounted inside of the camera front 2 and it is the resiliency of the metal itself which is relied upon to spring sufficiently to make and release the latch above described.

The camera body 1 may also be equipped with a known type of view finder 45 mounted on the top wall 46 of the camera body, there being an opening 47 through which the field of view may be defined.

The operation of my camera is extremely simple. With the parts in the folded position shown in Fig. 2, the handle 40' of the latch arm 40, best shown in Figs. 3 and 5, may be moved in the direction shown by the arrow, Fig. 5, and as soon as the opening 41 clears the groove 43 of the stud, the spaced springs 19 project the camera front 2 forwardly and into the picture-taking position of Fig. 1. This is accomplished since the intermediate portions 23 of these springs 19 engage the saddles 24 carried by the camera front 2. During this sliding movement, the front moves accurately forwardly on the rails 3 until the flanges 16 and 17 come into contact to retain the front in the position shown in Fig. 1. A picture may then be taken by operating the shutter lever 13 in the usual manner.

After pictures have been taken, in order to fold the camera the operator merely pushes the front 2 into the camera body 1. This action increases the tension on the springs 19 and when the parts are completely folded the latch arm 40 will snap over the headed stud 42 and into the groove 43 so as to hold the parts into the position shown in Figs. 2 and 3.

The shutter mechanism 11 may also be equipped with a knob 50 which can be moved to adjust the shutter for either time or instantaneous exposures by any suitable mechanism. Such shutters are commonly used on inexpensive cameras of this type.

Throughout the range of movement of the camera front 2 relative to the camera body 1 a completely light-tight connection is maintained between the rectangular walls 8 and the loosely fitting complementary-shaped rectangular walls 25 because of the gasket 26. This gasket does not have to guide or support the camera front 2 on the camera body 1 and consequently can be made of light weight plush material which will satisfactorily prevent light from entering between these two sets of walls. Thus, there is very little to impede the movement of the camera front 2 on the camera body 1 and the springs 19 have comparatively little work to do in thrusting the camera front 2 into a picture-taking position. Moreover, the interengaging rails 3 and the rail followers 7 are so fitted that the parts move smoothly and easily in opening and closing the camera.

What I claim as new and desire to be secured by Letters Patent of the United States is:

1. In a folding camera, the combination with a camera body, of a camera front movably mounted on the camera body for movement to a picture-taking and a folded position, and forming a two-part camera, complementary-shaped walls on the camera parts forming a light-tight connection between the camera front part and body part, means for limiting movement of the front relative to the camera body, and means tending to hold the parts in a picture-taking position including a pair of oppositely disposed coiled springs the ends of the springs being carried by one camera part and an intermediate part of said springs engaging the other camera part.

2. In a folding camera, the combination with a camera body, of a camera front movably mounted on the camera body for movement to a picture-taking and a folded position, and forming a two-part camera, complementary-shaped walls on the camera body and camera front forming a light-tight connection between the camera front part and body part, a slideway between the two camera parts comprising spaced rails on one part and rail engaging members carried by the other part for guiding the movement of the camera front on the camera body.

3. In a folding camera, the combination with a camera body, of a camera front movably mounted on the camera body for movement to a picture-taking and a folded position, and forming a two-part camera, complementary-shaped walls on the camera body and camera front forming a light-tight connection between the camera front part and body part, a slideway between the two camera parts comprising spaced rails on one part and rail engaging members carried by the other part for guiding the movement of the camera front on the camera body, and spring means tending to slide the rail engaging members in one direction on said rails.

4. In a folding camera, the combination with a camera body, of a camera front movably mounted on the camera body for movement to a picture-taking and a folded position, and forming a two-part camera, complementary-shaped walls on the camera body and camera front shaped to fit loosely, a soft gasket between the loosely fitting walls to form a light-tight connection between the camera parts, means separate from said loosely fitting walls for accurately guiding the movement of the camera front on said camera body.

5. In a folding camera, the combination with a camera body, of a camera front movably mounted on the camera body for movement to a picture-taking and a folded position, and forming a two-part camera, complementary-shaped walls on the camera body and camera front shaped to fit loosely, a soft gasket between the loosely fitting walls to form a light-tight connection between the camera parts, means separate from said loosely fitting walls for accurately guiding the movement of the camera front on said camera body, and spring means for moving the front relative to the camera body on said accurate guiding means to position said camera parts in a picture-taking position.

6. In a folding camera, the combination with a camera body, of a camera front movably mounted on the camera body for movement to a picture-taking and a folded position, and forming a two-part camera, complementary-shaped walls on the camera body and camera front shaped to fit loosely, a soft gasket between the loosely fitting walls to form a light-tight connection between the camera parts, means separate from said loosely fitting walls for accurately guiding the movement of the camera front on said camera body, and coiled spring means for moving the front relative to the camera body on said accurate guiding means to position said camera parts in a picture-taking position, said coiled spring being attached at its ends to the camera and an intermediate part of the spring engaging the camera front.

7. In a folding camera, the combination with a camera body, of a camera front movably mounted on the camera body for movement to a picture-taking and a folded position, and forming a two-part camera, complementary-shaped walls on the camera body and camera front forming a light-tight connection between the camera front part and body part, a slideway between the two camera parts comprising spaced rails, one mounted on each side of the camera body spaced a somewhat greater distance apart than the width of the camera front part, and perforated ears projecting outwardly from the camera front and encircling the spaced rails to accurately guide movement of the camera front relative to the camera body.

8. A folding camera of the type including two parts, one adapted to telescope into the other, including in combination a main slideway connecting the two camera parts comprising spaced and parallel rails carried by one part, and rail followers slidably fitting the rails to move thereon carried by the other camera part for guiding one part relative to the other, loosely fitting complementary-shaped parallel walls carried by both camera parts, and means including said walls for making a light-tight connection therebetween.

MILLER R. HUTCHISON, Jr.